J. N. SKINNER.
Lathe-Chuck.
No. 221,746.    Patented Nov. 18, 1879.
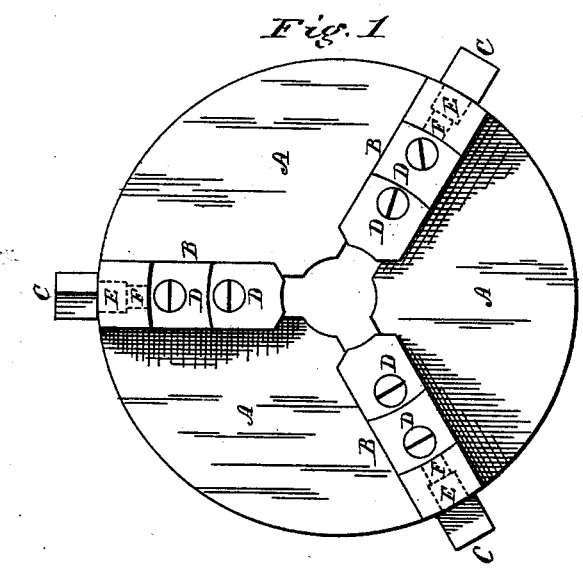
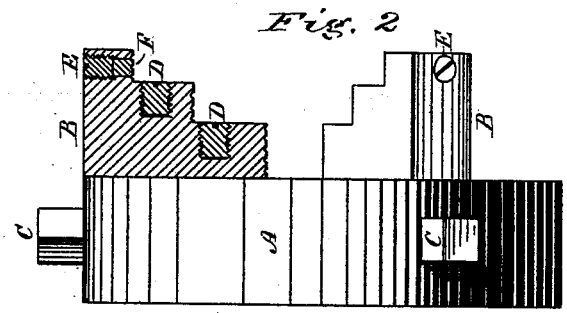

UNITED STATES PATENT OFFICE.

JAMES N. SKINNER, OF WINDSOR LOCKS, CONNECTICUT.

IMPROVEMENT IN LATHE-CHUCKS.

Specification forming part of Letters Patent No. 221,746, dated November 18, 1879; application filed July 12, 1879.

*To all whom it may concern:*

Be it known that I, JAMES N. SKINNER, of Windsor Locks, in the county of Hartford and State of Connecticut, have invented certain new and useful Improvements in Lathe-Chucks; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to the jaws of lathe-chucks of any ordinary construction.

The jaws of lathe-chucks as ordinarily constructed are made with successive steps or projections, which are intended to embrace and hold objects of different sizes. The planes of these steps, which are parallel to the face-plate of the lathe, are usually turned true with the body of the chuck, and are sometimes ground to a true plane after the chuck is finished. It often happens, however, that when the chuck is set upon the face-plate of the lathe, the surfaces of the steps do not come exactly in the same plane at right angles to the axis, so that any work or object placed in the jaws to be turned is not held in an exact and true position when resting against the jaws of the chuck.

My invention has for its object the ready and easy adjustment of the steps or surfaces of the jaws, so that they shall be in the same plane at right angles to the axis, and hold any object placed within the jaws in a true position.

My invention consists in arranging and constructing the jaws with adjusting-screws, the heads of which form a rest for objects placed in the jaws, or which are so arranged as to press out a small plug for the same purpose.

In the accompanying drawings, Figure 1 shows a front view of a chuck having jaws furnished with my improvements. Fig. 2 shows a side view of the same, with the upper jaw in section, so as to show the adjusting-screws more plainly.

A is the body of the chuck. B B B are the jaws. These move in grooves in the body A in the usual manner, and are operated by screws C, which are moved either separately or all together in any ordinary manner.

D D are screws let into the vertical faces of the jaws. They are intended to be flush with the faces when the chuck is finished, but are capable of being screwed out when required.

Whenever by use or from any cause the faces of the jaws are found out of true, the several faces in the different jaws which should be in the same place can be readily adjusted by screwing out the screws until the projecting heads are in the same plane at right angles to the axis. This can be done by turning the chuck around and making all of the heads, one in each jaw, come exactly in contact with a fixed object. Where there are more than one set of steps, each set can be brought into a true position in the same manner.

E E E are adjusting-screws placed in a position at right angles to those upon the vertical faces, and are intended to true the griping-faces of the jaws, so that they shall be all in the same circle around the axis. This part of my improvement is more applicable to universal chucks, or those in which the jaws are simultaneously moved out or in.

The screws E operate upon a plug, F, which is inserted into the face of the jaw, and is moved out or in by turning the screw E. The end of the plug serves the same purpose as the heads of the screws D before described. The inner end of the plug, however, can be grooved or roughened, if desired, as is customary with the griping-faces of the jaws, and does not require to turn around, as is the case with the screw-heads.

By means of my invention the faces of the steps of the jaws can be at any time readily and easily adjusted to their true position with regard to the axis of the lathe.

What I claim as my invention is—

The adjusting-screws D, in combination with the jaws of a lathe-chuck, substantially as described.

JAMES N. SKINNER.

Witnesses:
THEO. G. ELLIS,
WENDELL R. CURTIS.